(12) United States Patent
Fuse et al.

(10) Patent No.: US 8,776,497 B2
(45) Date of Patent: Jul. 15, 2014

(54) COGENERATION SYSTEM

(75) Inventors: Takuya Fuse, Nagoya (JP); Kazutoshi Nishizawa, Toyoake (JP); Kazutoshi Kuwayama, Kariya (JP)

(73) Assignee: Denso Corporation, Kariya (JP)

( * ) Notice: Subject to any disclaimer, the term of this patent is extended or adjusted under 35 U.S.C. 154(b) by 68 days.

(21) Appl. No.: 13/476,282

(22) Filed: May 21, 2012

(65) Prior Publication Data
US 2012/0299306 A1  Nov. 29, 2012

(30) Foreign Application Priority Data

May 25, 2011 (JP) ................................. 2011-116760

(51) Int. Cl.
*F01N 3/00* (2006.01)

(52) U.S. Cl.
USPC .................. 60/285; 60/274; 60/282; 60/295; 123/3

(58) Field of Classification Search
USPC .................................................. 60/274–324
See application file for complete search history.

(56) References Cited

U.S. PATENT DOCUMENTS

| | | | | |
|---|---|---|---|---|
| 3,772,879 | A * | 11/1973 | Engdahl | 60/671 |
| 4,750,453 | A * | 6/1988 | Valdespino | 123/3 |
| 6,367,258 | B1 * | 4/2002 | Wen et al. | 60/641.7 |
| 8,272,353 | B2 * | 9/2012 | Dincer et al. | 123/3 |
| 8,370,049 | B1 * | 2/2013 | Shimizu et al. | 701/104 |
| 8,464,515 | B2 * | 6/2013 | Aso et al. | 60/285 |
| 2011/0088378 | A1 * | 4/2011 | Prior et al. | 60/320 |
| 2011/0265463 | A1 | 11/2011 | Kojima et al. | |
| 2011/0283684 | A1 * | 11/2011 | Aso et al. | 60/285 |
| 2011/0283959 | A1 * | 11/2011 | Aso et al. | 123/3 |

FOREIGN PATENT DOCUMENTS

| | | |
|---|---|---|
| JP | 2002-276390 | 9/2002 |
| JP | 2010-216274 | 9/2010 |
| JP | 2010-223575 | 10/2010 |
| JP | 2010-229885 | 10/2010 |

OTHER PUBLICATIONS

Office action dated Apr. 9, 2013 in corresponding Japanese Application No. 2011-116760.
Office Action dated Feb. 21, 2014 in the corresponding CN application No. 201210159895.4 with English translation.
"Performance of Chemical Heat Pump Packed with a New Adsorption Material" Journal of Huadong Science and Engineering University, by Jiao Yang, et al. (No. 6, vol. 28, Dec. of 2002).

* cited by examiner

*Primary Examiner* — Jesse Bogue
(74) *Attorney, Agent, or Firm* — Harness, Dickey & Pierce, PLC

(57) ABSTRACT

A cogeneration system includes a fuel evaporator; an internal combustion engine which outputs mechanical energy by combusting fuel evaporated by the fuel evaporator; an electric energy generator that converts the mechanical energy to an electric energy; a cold energy recovery portion which recovers cold energy generated when the fuel evaporator evaporates the fuel; an exhaust heat recovery portion which recovers heat exhausted from the engine; and a gas cleaner that cleans nitrogen oxides contained in gas exhausted from the engine. When the fuel is supplied to the gas cleaner, the fuel reduces the nitrogen oxides by reacting with the nitrogen oxides.

9 Claims, 1 Drawing Sheet

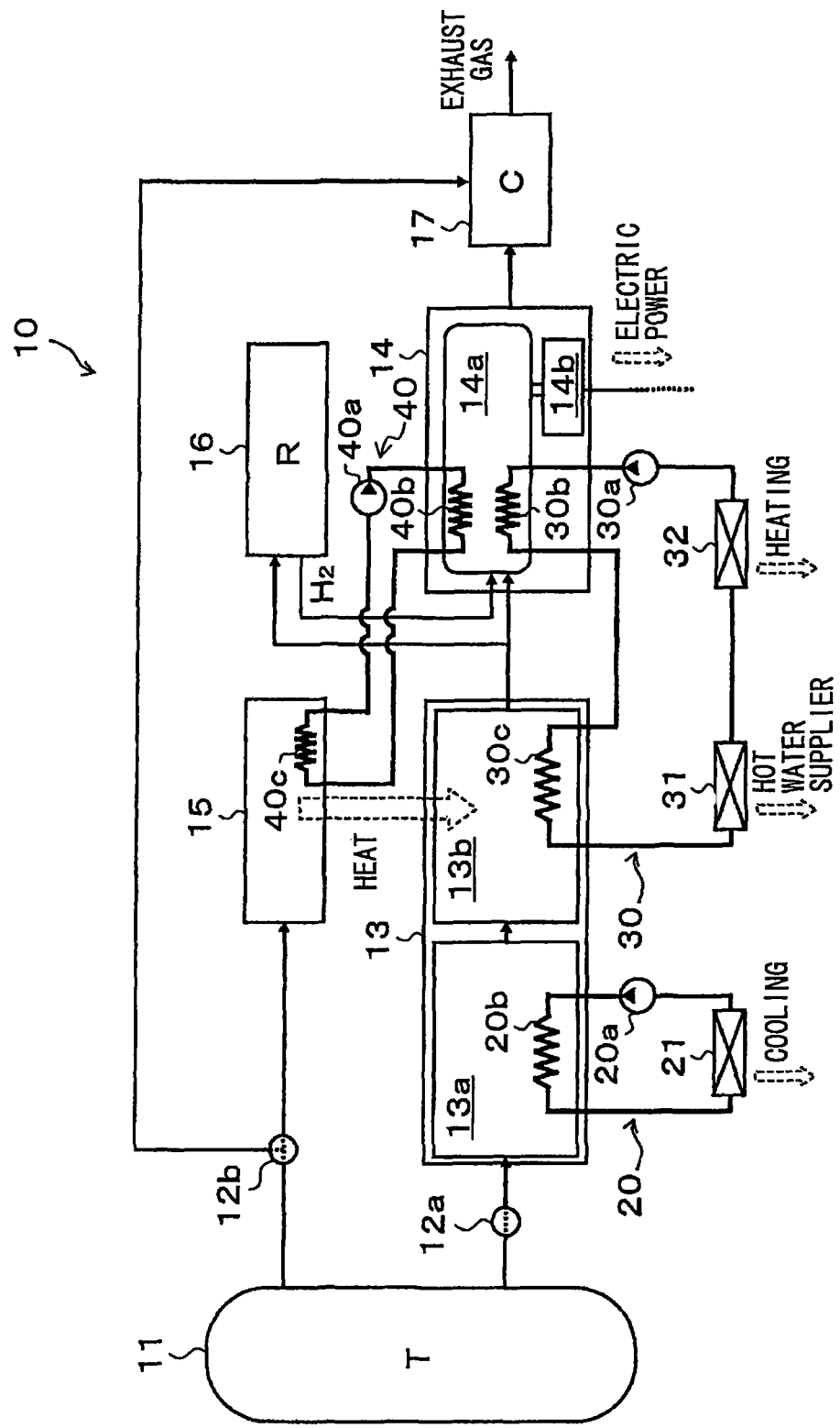

COGENERATION SYSTEM

CROSS REFERENCE TO RELATED APPLICATION

This application is based on Japanese Patent Application No. 2011-116760 filed on May 25, 2011, the disclosure of which is incorporated herein by reference in its entirety.

TECHNICAL FIELD

The present disclosure relates to a cogeneration system.

BACKGROUND

JP-A-2010-229885 describes a cogeneration system with the aim of efficiently using energy generated by combusting fuel.

In the cogeneration system, a generator is driven by a rotation power (mechanical energy) of an engine in which fuel is combusted, and outputs electrical energy. Further, water is heated by waste heat (heat energy) of the combustion, and the heated water is supplied from a hot water supplier, so that the energy obtained by the combustion is efficiently used.

However, the cogeneration system merely uses a part of the energy obtained by the combustion, that is, the potential energy of fuel is not sufficiently used.

For example, fuel before being supplied to the engine is not taken into consideration in the above system. The potential energy of the fuel before being supplied to the engine is not efficiently used.

Furthermore, gas exhausted after the combustion is not taken into consideration in the above system. The efficiency of the cogeneration system becomes low when the engine is activated with low operation efficiency to restrict air pollutant contained in the exhaust gas from being emitted to atmospheric air.

Heat energy is obtained when chemical reaction is generated between fuel and oxygen. However, the potential energy of fuel means not only the amount of heat theoretically generated by the fuel combustion but also internal energy of fuel before the combustion.

SUMMARY

It is an object of the present disclosure to provide a cogeneration system in which potential energy of fuel is efficiently used.

According to an example of the present disclosure, a cogeneration system includes a fuel evaporator, an internal combustion engine, an electric energy generator, a cold energy recovery portion, an exhaust heat recovery portion and a gas cleaner. The fuel evaporator evaporates liquid fuel. The internal combustion engine outputs mechanical energy by combusting the fuel evaporated by the fuel evaporator. The electric energy generator converts the mechanical energy to an electric energy. The cold energy recovery portion recovers cold energy generated when the fuel evaporator evaporates the fuel. The exhaust heat recovery portion recovers heat exhausted from the engine when the engine combusts the fuel. The gas cleaner cleans nitrogen oxides contained in gas exhausted from the engine when the engine combusts the fuel, and the fuel reduces the nitrogen oxides by reacting with the nitrogen oxides when the fuel is supplied to the gas cleaner.

Accordingly, the potential energy of fuel can be efficiently used.

BRIEF DESCRIPTION OF THE DRAWINGS

The above and other objects, features and advantages of the present disclosure will become more apparent from the following detailed description made with reference to the accompanying FIGURE that is a block diagram illustrating a cogeneration system according to an embodiment.

DETAILED DESCRIPTION

Embodiment

As shown in FIGURE, a cogeneration system 10 has a high-pressure tank 11 as a liquid fuel storing portion that stores pressurized liquid fuel having high-pressure.

The fuel stored in the tank 11 has combustibility and is combusted in an engine 14a of a power generator portion 14 to be mentioned later. The fuel may be easily liquefied at ordinary temperature such as about 15° C.-25° C. under the high-pressure condition, so that the production cost can be reduced.

For example, the fuel may be ammonia ($NH_3$) having combustibility and being liquefied at the ordinary temperature under a condition where the pressure is equal to or less than 1.5 MPa. Because ammonia is a compound containing hydrogen, hydrogen gas having combustibility can be generated by reforming ammonia.

Alternatively, the fuel may be an alcoholic substance such as dimethyl-ether. Furthermore, the fuel containing hydrogen may further include at least one sort of atoms among sulfur (S), oxygen (O), nitrogen (N), and halogen in the molecule, and a hydrogen bond may be achieved between the molecules.

The cogeneration system 10 includes a fuel evaporator 13, a heat storing portion 15 and a gas cleaner 17. The fuel evaporator 13 is connected to a fuel outlet port of the tank 11 through a first flow rate control valve 12a, and evaporates the fuel. The heat storing portion 15 and the gas cleaner 17 are connected to a fuel outlet port of the tank 11 through a second flow rate control valve 12b. The heat storing portion 15 has a heat emitting agent which reversibly has a chemical reaction with the fuel, and stores heat. The gas cleaner 17 cleans nitrogen oxides contained in gas exhausted from the engine 14a in which the fuel is combusted.

Each of the first flow rate control valve 12a and the second flow rate control valve 12b has a valve body arranged in a fuel passage. When an opening degree of the fuel passage is controlled by the valve body of the first valve 12a, the amount of fuel flowing into the fuel evaporator 13 is controlled while the liquid fuel flowing out of the tank 11 is decompressed. Further, the amount of fuel flowing into the heat storing portion 15 and the gas cleaner 17 is controlled by the second valve 12b.

The flow rate control valve 12a, 12b is able to fully close the fuel passage so as to prohibit the fuel from flowing out of the tank 11. The flow rate control valve 12a, 12b is controlled by a control signal output from a system controller (not shown).

The fuel evaporator 13 is made of a heat exchanger having a first evaporation part 13a and a second evaporation part 13b. The liquid fuel flowing out of the tank 11 is evaporated in the first evaporation part 13a. In the second evaporation part 13b, the liquid fuel or two-phase fuel constructed by the liquid fuel and gas fuel flowing out of the first evaporation part 13a is evaporated.

More specifically, in the first evaporation part 13a, heat is exchanged between the liquid fuel flowing out of the tank 11 and a first heat medium circulating through a cooling circuit 20 to be mentioned later.

In the second evaporation part 13b, heat is exchanged between the liquid or two-phase fuel flowing out of the first evaporation part 13a and a cooling water (coolant) of the engine 14a circulating through a coolant circuit 30 to be mentioned later.

A temperature of the cooling water of the engine 14a which circulates through the coolant circuit 30 is set higher than a temperature of the first heat medium which circulates through the cooling circuit 20. When the fuel flowing out of the tank 11 is made to flow in order of the first evaporation part 13a and the second evaporation part 13b, a temperature difference is secured between the fuel and the first heat medium in the first evaporation part 13a, and a temperature difference is secured between the fuel and the cooling water in the second evaporation part 13b. Thus, the fuel is efficiently evaporated.

Furthermore, the heat exchange properties of the first evaporation part 13a and the second evaporation part 13b are controlled in a manner that the fuel flowing out of the fuel evaporator 13 becomes gaseous fuel which certainly has a superheat degree when the power generator portion 14 has an ordinary operation.

The temperature of the cooling water may be not sufficiently higher than the temperature of the first heat medium, for example, at the time of starting the engine 14a. In this case, the fuel flowing out of the fuel evaporator 13 may not become the gaseous fuel because the temperature of fuel is low. However, according to the embodiment, because heat is supplied to the second evaporation part 13b from the heat storing portion 15, the fuel flowing out of the fuel evaporator 13 becomes the gaseous fuel which certainly has the superheat degree.

The heat storing portion 15 has a reaction container accommodating the heat emitting agent which reversibly has a chemical reaction with the fuel. The heat emitting agent may be made of metal halide such as strontium chloride ($SrCl_2$), for example.

Strontium chloride has reversible chemical reaction with ammonia corresponding to the fuel, and the ammonia addition compound of strontium chloride and heat are generated in the reversible chemical reaction, as shown in the following chemical formula (1), for example, in which the ammoniated strontium chloride has 8 mols of ammonia ($SrCl_2.8NH_3$). Further, when the ammoniated strontium chloride absorbs heat, ammonia and strontium chloride are reproduced.

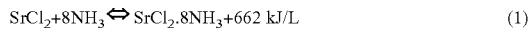

$$SrCl_2 + 8NH_3 \Leftrightarrow SrCl_2.8NH_3 + 662 \text{ kJ/L} \quad (1)$$

In the present embodiment, when the temperature of the cooling water is not sufficiently higher than the temperature of the first heat medium, the fuel is supplied to the reaction container and the heat emitting reaction is produced. Then, the produced heat is supplied to the second evaporation part 13b. Thus, the fuel flowing out of the fuel evaporator 13 becomes the gaseous fuel which certainly has the superheat degree.

When the cogeneration system 10 has ordinary operation, the waste heat of the engine 14a is supplied to the chemical reaction product, that is the ammoniated strontium chloride, of the reaction container through a second heat medium which circulates through a heating circuit 40 to be mentioned later. Thus, ammonia and strontium chloride are reproduced.

As shown in FIGURE, the flow of the gaseous fuel flowing out of the fuel evaporator 13 is branched into two flows. One of the two flows is supplied to an inlet port of the engine 14a of the power generator portion 14, and the other of the two flows is supplied to a reformer 16 which reforms the gaseous fuel into hydrogen gas.

The power generator portion 14 is constructed to have the engine 14a and a generator 14b. The engine 14a outputs rotation power (mechanical energy) by combusting fuel evaporated in the fuel evaporator 13. The generator 14b is driven by the rotation power output from the engine 14a, and generates electric energy by converting the mechanical energy into the electric energy.

The engine 14a is constructed by a reciprocating compressor type engine, and is controlled by the system controller. A revolving shaft of the engine 14a is directly linked with a revolving shaft of the generator 14b. The generator 14b starts the power generation when the engine 14a is activated.

The reformer 16 produces the hydrogen gas by heating the gaseous fuel under a catalyst. At this time, the reforming reaction is generated when the temperature of the gaseous fuel is raised to a predetermined reformable temperature. Specifically, ammonia corresponding to the fuel is heated to have a temperature equal to or higher than 350° C. Thus, the reforming reaction is conducted under catalyst, and the hydrogen gas is generated.

The hydrogen gas generated in the reformer 16 is mixed with intake air, and corresponds to auxiliary fuel. The hydrogen gas and the gaseous fuel are supplied to a combustion chamber through the inlet port of the engine 14a. Because the combustion speed of hydrogen is higher than that of ammonia, the engine 14a can be restricted from having fire when hydrogen and ammonia are combusted in the mixed state.

When the hydrogen gas and the gaseous fuel are combusted in the engine 14a, the exhaust gas is discharged from an exhaust port of the engine 14a and flows into a gas cleaner 17. In the gas cleaner 17, selective reaction is generated between nitrogen oxides contained in the exhaust gas and ammonia under catalyst, so that the nitrogen oxides is decomposed into water and nitrogen. The exhaust gas is discharged into atmospheric air after the nitrogen oxides are cleaned by the gas cleaner 17.

Next, the cooling circuit 20, the coolant circuit 30, and the heating circuit 40 are explained.

When fuel evaporates in the first evaporation part 13a of the fuel evaporator 13, the first heat medium is cooled by absorbing the latent heat. The first heat medium circulates in the cooling circuit 20, and, for example, is made of water or ethylene glycol water solution. In other words, the cooling circuit 20 causes the first heat medium to recover the cold energy produced when fuel evaporates in the first evaporation part 13a of the fuel evaporator 13. The cooling circuit 20 corresponds to a cold energy recovery portion.

Specifically, the cooling circuit 20 is constructed by annually connecting in order of a first water pump 20a, a first passage 20b, and a cooling indoor heat exchanger 21 with a pipe. The first water pump 20a compressingly sends the first heat medium. The first passage 20b is defined in the first evaporation part 13a of the fuel evaporator 13. In the cooling indoor heat exchanger 21, heat is exchanged between the first heat medium and air. The first water pump 20a is controlled by a control signal output from the system controller.

When fuel combusts in the engine 14a, the cooling water is heated by absorbing waste heat of the engine 14a. The cooling water circulates in the coolant circuit 30, and, for example, is made of water or ethylene glycol water solution. In other words, the coolant circuit 30 causes the cooling water to recover the waste heat produced when fuel combusts in the engine 14a. The coolant circuit 30 corresponds to an exhaust heat recovery portion.

Specifically, the coolant circuit 30 is constructed by annually connecting in order of a second water pump 30a, a first passage 30b, a second passage 30c, a coolant-water heat exchanger 31, and a heating indoor heat exchanger 32 with a pipe. The second water pump 30a compressingly sends the cooling water. The first passage 30b is defined in the engine 14a. The second passage 30c is defined in the second evaporation part 13b of the fuel evaporator 13. In the heating indoor heat exchanger 32, heat is exchanged between the cooling water and air.

In the coolant-water heat exchanger 31, heat is exchanged between the cooling water which circulates through a coolant passage and water which circulates through a water passage, so that the water is heated and the heated water is supplied to a hot water supplier. The hot water heated in the heat exchanger 31 is stored in a hot water storage tank (not shown). The second water pump 30a is controlled by a control signal output from the system controller.

The heat medium of the heating circuit 40 absorbs the waste heat of the engine 14a, and the absorbed heat is supplied to the chemical reaction product in the reaction container of the heat storing portion 15. The heat medium is, for example, water or ethylene glycol water solution.

More specifically, the heating circuit 40 is constructed by annually connecting in order of a third water pump 40a, a second passage 40b, and a third passage 40c with a pipe. The third water pump 40a compressingly sends the second heat medium. The second passage 40b is defined in the engine 14a. The third passage 40c is defined in the reaction container of the heat storing portion 15. The third water pump 40a is controlled by a control signal output from the system controller.

The system controller (not shown) is constructed of a well-known microcomputer including CPU and memory circuit such as ROM and RAM, an output circuit which outputs control signals or control voltages to various equipments, an input circuit to which detection signals are input from various sensors, and a power supply circuit, for example.

The valves 12a, 12b, the engine 14a, and the pumps 20a-40a are connected to the output side of the system controller, and the system controller controls the operation of the valves 12a, 12b, the engine 14a, and the pumps 20a-40a. Moreover, various sensors are connected to the input side of the system controller, and detect physical quantities used for controlling the valves 12a, 12b, the engine 14a, and the pumps 20a-40a.

Specifically, the various sensors correspond to a sensor group including a power consumption meter, an engine rotation sensor, a coolant temperature sensor and the like (not shown). The power consumption meter detects the consumption amount of the electric power output from the generator 14b. The engine rotation sensor detects a rotation number of the engine 14a. The coolant temperature sensor detects the temperature of the cooling water flowing out of the engine 14a.

The coolant temperature sensor detects the temperature of the cooling water flowing out of the first passage 30b of the coolant circuit 30, for example. Alternatively, the coolant temperature sensor may detect the temperature of the second heat medium flowing out of the second passage 40b of the heating circuit 40, which is approximately equal to the temperature of the cooling water flowing out of the first passage 30b of the coolant circuit 30.

Further, a console panel (not shown) is connected to the input side of the system controller, and includes a start switch, a temperature setting switch, and the like. The cogeneration system 10 is started or stopped by operating the start switch. A temperature of hot water in the hot water supplier is set by operating the temperature setting switch. The manipulate signals of various switches are input from the console panel.

The system controller integrally has controllers that respectively control the above instruments, and the controllers are constructed by hardware and software. The controllers may be separated from each other.

Operation of the cogeneration system 10 will be described below. First, if the start switch is turned on, the system controller executes a system control program memorized in the memory circuit. The various equipments are controlled by the system control program based on operating state of the system.

When the cogeneration system 10 is activated, the system controller controls the valve opening of the first flow rate control valve 12a in a manner that a predetermined flow rate of fuel is supplied to the fuel evaporator 13. Further, the system controller controls the valve opening of the second flow rate control valve 12b in a manner that a predetermined flow rate of fuel is supplied to each of the heat storing portion 15 and the gas cleaner 17. Furthermore, the engine 14a of the power generator portion 14 is started in a state where the first and second water pumps 20a and 30a are operated with a predetermined pressure.

Thereby, the fuel supplied to the first evaporation part 13a of the fuel evaporator 13 through the first valve 12a is evaporated, by exchanging heat with the first heat medium flowing through the first passage 20b of the cooling circuit 20. In contrast, the first heat medium is cooled by the evaporation of the fuel, and flows into the cooling indoor heat exchanger 21 so as to exchange heat with air. Thus, the air is cooled and sent into a space to be air-conditioned.

The fuel evaporated in the first evaporation part 13a flows into the second evaporation part 13b. At the time of starting the cogeneration system 10, the temperature of the cooling water which circulates through the coolant circuit 30 is relatively low. In this case, even if heat is exchanged between the fuel flowing into the second evaporation part 13b and the cooling water which circulates the second passage 30c, evaporation of the fuel flowing into the second evaporation part 13b cannot be facilitated.

In contrast, according to the present embodiment, because the fuel is supplied to the heat storing portion 15 through the second flow rate control valve 12b, the fuel and the heat emitting agent have heat-emitting reaction in the reaction container of the heat storing portion 15. The heat generated by the reaction is supplied to the second evaporation part 13b of the fuel evaporator 13, so that evaporation of the fuel flowing into the second evaporation part 13b is facilitated.

Furthermore, the second passage 30c through which the cooling water flows is arranged at the second evaporation part 13b of the fuel evaporator 13. Therefore, the reaction heat is supplied to the cooling water which flows in the second passage 30c, and the temperature of the cooling water is raised quickly. Thus, warming-up of the engine 14a can be promoted.

In addition, the engine 14a is determined to be in an activation stage when the temperature of the cooling water detected by the sensor is equal to or lower than a first threshold temperature KT1 such as 40° C. Then, when the temperature of the cooling water detected by the sensor becomes equal to or more than a second threshold temperature KT2 such as 90° C., the engine 14a is determined to shift into an ordinary operation state from the activation state. At this time, the engine 14a is sufficiently warmed.

The gaseous fuel flowing out of the fuel evaporator 13 is supplied to the engine 14a and the reformer 16. In the engine 14a, the fuel is combusted and the rotation power (mechanical energy) is output. The rotation power is transmitted to the generator 14b, and electric energy is output from the generator 14b. In the reformer 16, the fuel is reformed into hydrogen. The hydrogen is combusted in the engine 14a together with the fuel.

The exhaust gas flowing out of the engine 14a is supplied to the gas cleaner 17. In the gas cleaner 17, the exhaust gas reacts with fuel supplied through the second flow rate control valve 12b, so that nitrogen oxides are reduced. Because the nitrogen oxides are eliminated, the exhaust gas is made cleaner and is discharged to atmospheric air in the cleaned state.

When the cogeneration system 10 shifts to the ordinary operation state, the system controller controls the valve opening of the first valve 12a to increase the flow rate of fuel supplied to the fuel evaporator 13 in accordance with increase in the consumption power detected by the power meter. Further, the system controller controls the rotation number of the engine 14a.

Furthermore, the system controller stops the fuel supply to the heat storing portion 15, and controls the valve opening of the second valve 12b to increase the flow rate of fuel supplied to the gas cleaner 17 in accordance with increase in the consumption power detected by the power meter. Moreover, the system controller activates the first to third water pumps 20a-40a to have a predetermined performance.

In the ordinary operation state, fuel is evaporated in the first evaporation part 13a of the fuel evaporator 13, similarly to the activation stage, and the fuel flows into the second evaporation part 13b. At this time, because the temperature of the cooling water flowing out of the first passage 30b of the coolant circuit 30 is raised to equal to or higher than the second threshold temperature KT2, the fuel flowing into the second evaporation part 13b is heated with the cooling water of the second passage 30c, so that the evaporation is promoted.

Furthermore, the cooling water flowing out of the second passage 30c flows into the coolant-water heat exchanger 31, and the cooling water (coolant) exchanges heat with water. Thus, the water is heated and the heated water is supplied through the hot water supplier. The cooling water flowing out of the coolant-water heat exchanger 31 flows into the heating indoor heat exchanger 32, and exchanges heat with air. Thereby, the air is heated and sent into a space to be air-conditioned.

Moreover, in the ordinary operation state, the chemical reaction product in the reaction container is heated by the second heat medium which circulates the third passage 40c of the heating circuit 40, and ammonia and strontium chloride are reproduced. The operations of the power generator portion 14, the reformer 16, and the gas cleaner 17 are approximately the same as the activation stage.

According to the embodiment, the electric power generated in the power generator portion 14 can be used. Further, because the cogeneration system 10 has the coolant circuit 30 corresponding to an exhaust heat recovery portion, the waste heat of the engine 14a can be effectively used in the coolant-water heat exchanger 31 to heat the water to be supplied from the hot water supplier. Further, the waste heat of the engine 14a can be effectively used in the heating indoor heat exchanger 32 to heat the air for a heating operation.

Furthermore, the cogeneration system 10 has the cooling circuit 20 corresponding to a cold energy recovery portion. Therefore, the cold energy generated by a variation in the internal energy can be effectively used for a cooling operation through the cooling indoor heat exchanger 21. The fuel before being supplied to the engine 14a has potential energy, and the internal energy is a part of the potential energy.

Furthermore, the cogeneration system 10 has the gas cleaner 17. Even if the concentration of nitrogen oxides is increased in the exhaust gas by giving priority to high operation efficiency, the nitrogen oxides can be decomposed autonomously, without receiving energy supply from outside. Therefore, the potential energy of fuel can be efficiently converted into mechanical energy in a state where the priority is given to the high operation efficiency of the engine 14a.

Furthermore, the cogeneration system 10 has the reformer 16. Therefore, hydrogen having the high combustion speed can be supplied to the engine 14a. When the engine 14a is activated, the engine 14a can be warmed up promptly and the operation efficiency of the engine 14a can be raised promptly. Moreover, hydrogen is positively supplied to a cylinder of the engine 14a also after the end of warming-up. Therefore, the rotation number and the output of the engine 14a can be raised while the engine 14a is restricted from having fire. Thus, the operation efficiency of the engine 14a can be raised further.

Furthermore, the cogeneration system 10 has the heat storing portion 15. Therefore, the reaction heat is produced when fuel and heat emitting agent react in the heat storing portion 15, and is supplied to the second evaporation part 13b of the fuel evaporator 13. Thus, the evaporation of the fuel can be promoted in the second evaporation part 13b. Furthermore, the warming-up of the engine 14a can be promoted by supplying the reaction heat to the engine 14a of the power generator portion 14.

Furthermore, the waste heat of the engine 14a is collected in the coolant circuit 30, and is supplied to the chemical reaction product produced by the reaction between the fuel and the heat emitting agent. Therefore, the fuel and the heat emitting agent can be reproduced autonomously, without receiving supply of heat from outside. Thus, the reproduced fuel can be effectively used.

The present disclosure is not limited to the above embodiment.

A flow rate controller that controls a flow rate of fuel supplied to the fuel evaporator 13, the heat storing portion 15, and the gas cleaner 17 from the fuel tank 11 is not limited to the first and second flow rate control valves 12a and 12b. For example, as the flow rate controller, the fuel tank 11 may have three fuel outlet ports, and a flow rate control valve is arranged in the respective fuel outlet port so as to control the flow rate of fuel supplied to each of the fuel evaporator 13, the heat storing portion 15, and the gas cleaner 17.

A reaction heat supplier that supplies the reaction heat to the second evaporation part is not described in details in the above embodiment. Specifically, similarly to the cooling circuit 20 and the heating circuit 40, the reaction heat may be supplied to fuel through a heat medium by providing a heat medium circuit. Furthermore, the reaction container of the heat storing portion 15 may be arranged in an evaporation space of the second evaporation part 13b.

The fuel obtained by reproducing the chemical reaction product is not referred in the above embodiment. The reproduced fuel may be supplied to the engine 14a of the power generator portion 14 and the gas cleaner 17.

The cold energy collected in the cooling circuit 20 is not limited to be used for the cooling operation. For example, the cold energy may be used for cooling inside of a refrigerator or freezer.

Moreover, the waste heat collected in the heating circuit 40 is not limited to be used for the heating operation or the hot water supplier. For example, the waste heat may be used for a floor heating system.

The coolant circuit 30 and the heating circuit 40 may be integrated into one circulation circuit through which heat medium flows. For example, the one circulation circuit may be constructed by annually connecting the second water pump 30a, the first passage 30b for the cooling water, the third passage 40c for the second heat medium, the second passage 30c for the cooling water, the coolant-water heat exchanger 31, and the heating indoor heat exchanger 32.

The flow rate of fuel supplied to the fuel evaporator 13 is increased in accordance with increase in the power consumption amount detected by the power meter in the ordinary operation state. Alternatively, a battery may be disposed to store electric power output from the generator 14b, and the rotation number of the engine 14a may be controlled by increasing the flow rate of fuel supplied to the fuel evaporator 13 in accordance with decrease in the remaining power of the battery.

The reaction heat generated in the heat storing portion 15 is supplied to at least one of the fuel evaporator 13 and the engine 14a so as to heat the fuel evaporator 13 and/or the engine 14a. The reaction heat may be supplied to at least one of the fuel evaporator 13 and the engine 14a so as to heat fuel to be supplied to the fuel evaporator 13 and/or the engine 14a.

The expression of "the exhaust heat generated when the fuel is combusted in the engine 14a" also means "heat recovered by the exhaust heat recovery portion 30".

Such changes and modifications are to be understood as being within the scope of the present disclosure as defined by the appended claims.

What is claimed is:

1. A cogeneration system comprising:
 a fuel evaporator that evaporates a liquid fuel;
 an internal combustion engine which outputs mechanical energy by combusting the fuel evaporated by the fuel evaporator;
 an electric energy generator that converts the mechanical energy to an electric energy;
 a cold energy recovery portion which recovers cold energy generated when the fuel evaporator evaporates the fuel;
 an exhaust heat recovery portion which recovers heat exhausted from the engine when the engine combusts the fuel;
 a gas cleaner that cleans nitrogen oxides contained in gas exhausted from the engine when the engine combusts the fuel, wherein the fuel reduces the nitrogen oxides by reacting with the nitrogen oxides when the fuel is supplied to the gas cleaner; and
 a heat storing portion including a heat emitting agent that chemically reacts with the fuel and emits heat, the heat emitting agent having a reversible reaction with the fuel, wherein
 the fuel generates reaction heat when the fuel is supplied to the heat storing portion,
 the reaction heat is supplied to at least one of the internal combustion engine and the fuel evaporator, and
 the heat emitting agent is reproduced when the heat exhausted from the engine is supplied to the heat storing portion.

2. The cogeneration system according to claim 1, further comprising:
 a reformer that reforms the fuel, wherein
 the fuel is a compound containing hydrogen,
 the reformer generates hydrogen by reforming the fuel, and
 the hydrogen generated by the reformer is supplied to the internal combustion engine.

3. The cogeneration system according to claim 1, wherein the fuel is ammonia.

4. The cogeneration system according to claim 1, further comprising:
 a fuel tank that stores liquid fuel;
 a first passage portion through which the liquid fuel flows from the fuel tank to the fuel evaporator; and
 a second passage portion through which the liquid flows from the fuel tank into the gas cleaner.

5. The cogeneration system according to claim 1, wherein the cold energy recovering portion recovers a potential energy of the liquid fuel before being supplied to the engine as the cold energy.

6. The cogeneration system according to claim 1, wherein the cold energy recovering portion has a heat exchanger in which heat is exchanged between a heat medium and air.

7. The cogeneration system according to claim 1, wherein the liquid fuel is the primary fuel used for combustion.

8. The cogeneration system according to claim 1, wherein the liquid fuel that is evaporated by the fuel evaporator is the only fuel supplied to the internal combustion engine.

9. The cogeneration system according to claim 1, wherein the liquid fuel is the only fuel used for combustion.

* * * * *